(Model.)
C. E. W. WOODWARD.
CYCLOMETER.
No. 374,919.  Patented Dec. 13, 1887.
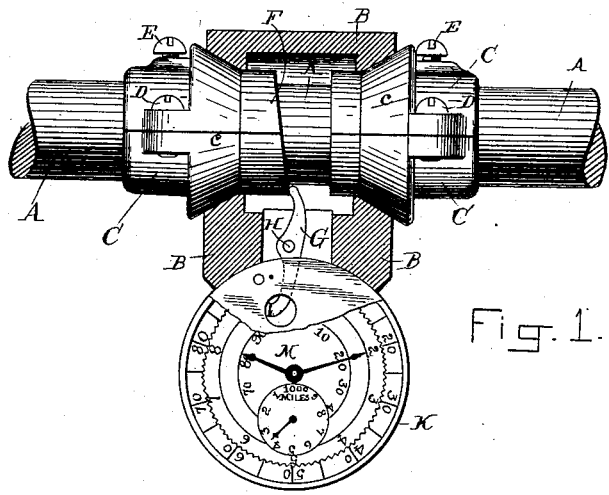
Fig. 1.
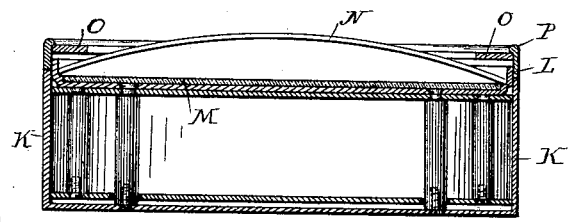
Fig. 2.
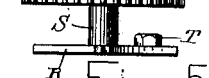
Fig. 5.
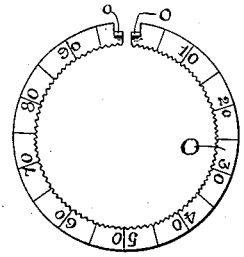
Fig. 4.
Fig. 3.
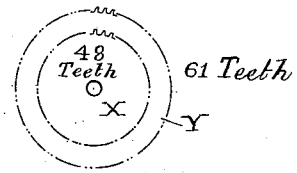
Fig. 6.
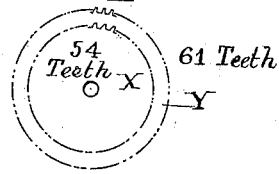
Fig. 7.
WITNESSES:
James P. Prince
Edwin G. Alexander
INVENTOR:
Charles E. W. Woodward
by A. H. Spencer, attorney (Model.)     C. E. W. WOODWARD.     2 Sheets—Sheet 2.
CYCLOMETER.

No. 374,919.     Patented Dec. 13, 1887.

WITNESSES:
Thos. J. Kenny
Wm. Webster

INVENTOR:
Charles E. W. Woodward.
By N. H. Spencer
Attorney.

UNITED STATES PATENT OFFICE.

CHARLES E. W. WOODWARD, OF CAMBRIDGE, ASSIGNOR OF ONE-HALF TO THE OVERMAN WHEEL COMPANY, OF CHICOPEE, MASSACHUSETTS.

CYCLOMETER.

SPECIFICATION forming part of Letters Patent No. 374,919, dated December 13, 1887.

Application filed May 16, 1887. Serial No. 238,308. (Model.)

*To all whom it may concern:*

Be it known that I, CHARLES E. W. WOODWARD, of Cambridge, in the county of Middlesex and State of Massachusetts, have invented certain new and useful Improvements in Cyclometers, of which the following, taken in connection with the accompanying drawings, is a specification.

The object of this invention is to provide for bicycles and other wheeled vehicles a cyclometer which shall indicate with absolute accuracy the distances traveled by such vehicles, and which, by the simple change of one wheel in the train of gearing, is made applicable with equal uniformity to the various sizes of traveling wheels, so as to correctly register the number of miles either size travels, the size of change-wheel being made to correspond to that of the traveling wheel. For convenience of changing this one element in the train I prefer to mount its arbor on a swinging plate having a fastening device, so as to bring the different sizes of change-wheel into gear with the train and to hold the wheel in proper position. The case in which the works are inclosed is of peculiar construction, as are the conical bearings for suspending the instrument and the indicator-ring for independent adjustment.

My invention consists in the devices and combinations of devices, herein described and shown, and particularly referred to in the appended claims.

Figure 8:
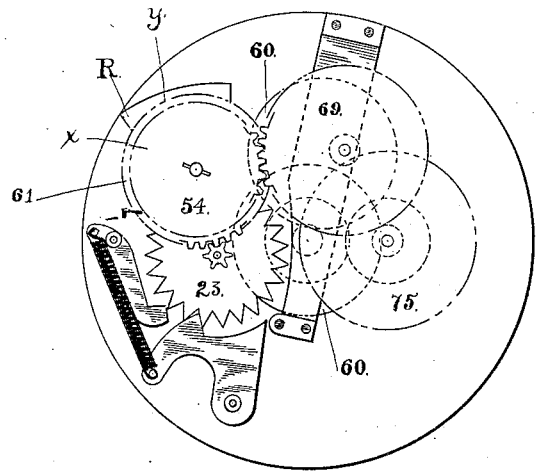
Figure 9:
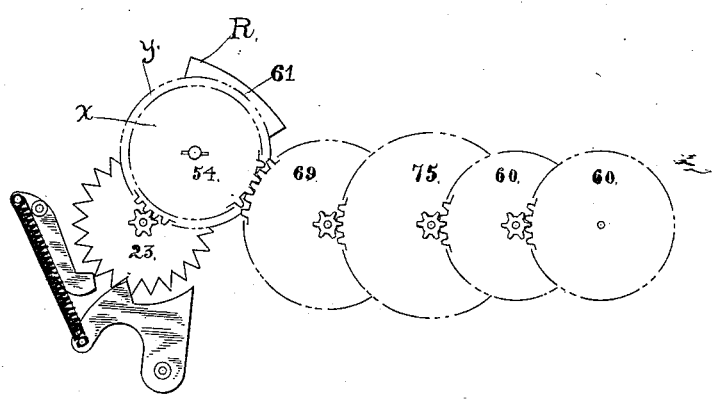

In the drawings, Figure 1 represents my improved cyclometer suspended from the axle of a traveling wheel, with part of the dial broken away and the suspending-sleeve in section. Fig. 2 is a section through the case drawn on an enlarged scale. Fig. 3 is a plan of the indicator-ring, and Figs. 4 to 7 are details relating to the change-wheel. Fig. 8 is a plan of the gearing in its working position on the lower plate, the upper plate being removed. Fig. 9 is a view of the train extended. Both these figures show the actuating-pawls.

A, Fig. 1, is the axle of the bicycle or other traveling wheel, from which the cyclometer is suspended by the sleeve B, having as its support the annular bearings C, which are each made in two parts meeting in an axial plane, and held closely together around the axle by the clamp-screws D. These bearings are adjustable toward and from each other along the axle to compensate for wear and prevent rattling, and when adjusted are held firmly with their tapering bearing-faces c in contact with the corresponding surfaces of the hollow sleeve B. The set-screws E, which secure the bearings in position, are countersunk at their points in order to hold more firmly upon the cylindrical axle and prevent their working loose. One of the bearings C is prolonged cylindrically from its inner tapering face and formed as a cam, F, to act laterally at each revolution of the axle upon the lever G, pivoted at H to the sleeve and extending into the case to actuate the works, about as shown in the cyclometer patent to M. H. Downes, No. 363,218, dated May 17, 1887, upon which this part of my invention is an improvement. The two two-part conical bearings relatively adjustable and the cam formed between their tapering faces are features not found in said Downes patent.

The case shown in Fig. 2 has a deep cylindrical shell, K, affixed to the lower portion of the sleeve B, to receive the train of gearing held between two parallel plates and protect the works from injury. Secured to one of these plates is a cup-shaped diaphragm, L, having space for the paper dial M and shoulder for the edges of the crystal N to rest upon. The angle where the crystal meets the wall of the diaphragm may be filled with cement.

The flanged ring P is secured to the peripheral wall of the diaphragm above the crystal and the indicator-ring O. The diaphragm thus has the works attached to its lower side, and the dial, crystal, and indicator on its other side, so that as a unit they may be inserted in and removed from the case.

I put up the train of gearing with the dial, crystal, indicator, diaphragm, and flange all in position in readiness to insert in the shell K, the train being located between two parallel plates, through one of which and through the diaphragm and dial the arbors which carry the traversing hands project. The change-wheel is readily reached and one substituted in place of another, as desired, before the movement is placed in the shell, where it is held by screws from outside entering the posts, as in Fig. 2.

The arrrangement of parts, as shown, provides for the protection of the gearing and other apparatus from injury by the weather and for accessibility of the indicator at all times.

The indicator O is a graduated ring severed transversely, so as to be elastic radially, as provided in the Downes patent referred to. It is made to rest upon the edge of the diaphragm within the flange of the ring P, and to bear by its periphery frictionally against their walls, so as to remain in position when adjusted to denote the starting-point of any trip. I provide upturned lugs o at each side of the line of severance, so that on pressing either lug toward the other the diameter of the ring will be slightly reduced, and it will be readily adjustable to the new position of the hands. The ring represents one hundred miles of travel, and is stamped with the appropriate figures in succession for every five or ten miles. The graduation for separate miles I mark by serrations along the inner edge of the ring, and these are not only more distinct than marks upon the flat surface, but are more readily compared with the figures on the dial which they overlie.

I have devised for instruments measuring one thousand miles travel, or less, a train of gearing (best shown in Figs. 8 and 9) consisting of six driven wheels with driving-pinions on the axles of the first five meshing successively with the gear-teeth of said driven wheels, and by a careful mathematical calculation I have approximated so near to an exact measurement of the linear mile by my cyclometer applied to the usual sizes of traveling wheels that the variation from absolute accuracy does not exceed nineteen inches for any size traveling-wheel in one thousand miles travel and is precisely the same for each and every size. In my cyclometer I have assumed as the unit of measure the linear inch, and the calculation for the train of gears is founded upon the number of revolutions of a wheel of one inch diameter in traveling the distance of one thousand miles, or sixty-three millions three hundred and sixty thousand inches, which number is twenty millions one hundred and sixty-eight thousand one hundred and thirty-one revolutions of such one-inch wheel. The nearest approximation to this result which I have been able to obtain in a train is twenty millions one hundred and sixty-eight thousand one hundred and twenty-five revolutions, showing an error in going one thousand miles of six revolutions of a one-inch wheel, which would be by my system or method one fiftieth of six revolutions of a fifty-inch wheel, and so on—in other words, as above stated, a constant error of not over nineteen inches for each size of traveling-wheel in one thousand miles travel.

In my improved train of gearing the first driven wheel is a comparatively coarse-toothed ratchet-wheel driven by pawls actuated primarily by an external force. The first driving-wheel is the pinion on the axle of this ratchet-wheel, and, like the third, fourth, and fifth driving-wheels, is a six-leafed pinion, each of which, with the driven wheel on the same axle, is constant in its position and character. The driven wheels in the train have respectively a number of teeth, as follows: either twenty-three, sixty-one, sixty-nine, seventy-five, sixty, sixty or the equivalent thereof—viz., twenty-five, sixty-one, sixty-nine, sixty-nine, sixty, sixty.

The second driving-wheel has according to my system a number of teeth equal to the number of inches or units in diameter of the traveling wheel to which the cyclometer is to be applied; and another peculiarity of my invention is that this second driving-wheel is made readily removable, so that another having a greater or less number of teeth may be substituted for it and the same instrument be by such change adapted to accurately register the distance traveled by any one of a series of wheels, provided only that the number of teeth in said change-wheel is the same as the number of inches in diameter of the traveling wheel used.

By basing my calculations upon the revolutions of a one-inch traveling wheel the unavoidable error due to the uneven number of revolutions of a wheel of any whole number of inches diameter in mileage travel is eliminated, as nearly as is possible, once for all. If, therefore, said second driving-wheel has one actuating-tooth for a train to accurately register the mileage of a one-inch traveling wheel, then by increasing the number of its teeth to fifty, (or substituting for it a fifty-toothed wheel,) the speed of the train is increased fifty times, and it is adapted to correctly register the mileage of a traveling wheel of fifty inches diameter, and so on.

The number of teeth in the changeable driving-wheel, therefore, denotes the diameter in inches of the traveling wheel upon which the instrument is to be used, and this feature constitutes the essence of this part of my invention, no instrument heretofore made, to my knowledge, having a driving-wheel bearing this peculiar relation to the traveling wheel of the vehicle upon which it is to be used.

A train of gearing constituted as above described—that is, having six driven wheels and five driving-wheels of the specified numbers of teeth—is adapted to the measurement of distances up to one thousand miles; but if it is desired to measure not exceeding one hundred miles the last of the driven and the last of the driving wheels named will be omitted, and if no more than ten miles of distance are to be measured the last two of such driven and driving wheels will be omitted. This is because the fourth driven wheel of the train specified revolves once in ten miles and carries upon its axle the hand denoting such distance or fractions thereof as indicated upon the dial, while the fifth and sixth wheels revolve, respectively, once in one hundred and one thousand miles, each carrying the hand appropriate therefor.

The change-wheel is denoted on the drawings by the letter X, Figs. 5 to 9, and the driven wheel on the same axis by the letter Y. The one may be removed without the other; but in the illustration the two are shown as fixed to each other and removable together, and this I find to be the most convenient plan, although the wheel Y has one unvarying number of teeth, while the number on the wheel X changes, as stated. I therefore prefer to make a series of double wheels each composed of the constant part Y, of sixty-one teeth, and the changeable part X, having any number of teeth—say from thirty to sixty, inclusive—which number denotes in inches the diameter of traveling wheel for which the instrument is adapted.

In Figs. 8 and 9 the change wheel is represented as having fifty-four teeth.

For convenience in adjusting the different sizes of change-wheel to their places in the train I have provided the devices shown in Figs. 4 and 5, R representing a swinging or sliding plate carrying the movable arbor or post S, on which the change-wheel X Y revolves, and T a clamping-nut threaded to fix the plate in position, its screw-stud extending through a slot, U, in the plate, so that by loosening the nut the plate may be moved to bring any size of the change-wheel X laterally into engagement with the gear-wheel with which it meshes. The plate R is notched at its inner end, as at V, to fit against the post or arbor of the first driving-wheel, so that the constant member Y of the change-wheel X Y will properly engage with its driver. I make the slot U at a suitable point slightly wider than the diameter of the stud which extends through it, to permit the notch V to slip away from its post and the plate R to swing out freely in changing the wheel X.

Confining this part of my invention to instruments provided with a changeable driving-wheel having a number of teeth equal to the number of units in diameter of the traveling wheel for which it is adapted, I disclaim all other means of adapting a given instrument to wheels of various diameters. I especially disclaim all that is disclosed in the patent to Coffin, No. 323,498, dated August 4, 1885, odometers.

I claim as my invention—

1. The axle A and the two frusto-conical bearings C, fixed thereon and formed each in two laterally-separable parts united by screws around the axle and adjustable toward and from each other, in combination with the non-rotating suspending-sleeve B, having tapering surfaces corresponding with such bearings, substantially as set forth.

2. The two frusto-conical bearings C, each formed in two laterally-separable parts secured to each other and provided with means of relative adjustment upon the axle, one or both of said bearings having a cam formed upon it, as described, in combination with the sleeve B, suspended from said bearings and supporting the distance-measuring mechanism, and with means of actuating such mechanism from said cam, substantially as set forth.

3. In a cyclometer, the train of gearing contained between two parallel plates and the dial and crystal external thereto, in combination with the cup-shaped diaphragm L, interposed between and affixed to the dial and said plates, and with the ring P, the indicator O, and the inclosing-case, substantially as set forth.

4. The graduated indicator-ring O, serrated along its inner edge, severed transversely, and provided with lugs o near the line of severance, substantially as set forth.

5. In a distance-measuring instrument, a train of gearing consisting of a series of constant gear-wheels, in combination with a changeable driving-wheel, X, having a number of teeth equal to the number of inches in diameter of the traveling wheel for which the instrument is designed, substantially as set forth.

6. A cyclometer provided with a train of gearing on permanent bearings, in combination with the double spur-wheel X Y, made removable in both its parts from the train, said wheel having the constant driven part Y with an unvarying number of teeth, and the variable driving part X with a number of teeth equal to the number of units of diameter of the traveling wheel for which the instrument is adapted, substantially as set forth.

7. In a distance-measuring instrument, a train of gearing having four driven wheels formed, respectively, with twenty-three, sixty-one, sixty-nine, and seventy-five teeth, or with their described equivalents, in combination with two driving-wheels each having six teeth, and with an intermediate changeable driving-wheel having teeth equal in number to the number of inches in diameter of the traveling wheel for which it is designed, as set forth.

8. In a distance-register, a train of gearing adapted to receive as one of its members a driving-wheel having any desired number of teeth, and by such means to fit the device to accurately register the distance travel of any wheel having a diameter equal in inches or units of measure to the number of peripheral teeth in the driving-wheel so received, substantially as set forth.

9. A cyclometer provided with registering mechanism and with a train of gearing having a changeable member, as described, in combination with the sliding plate R, having a shouldered movable arbor, S, carrying such changeable member, and with suitable clamping means, substantially as set forth.

In testimony whereof I have signed my name to this specification, in the presence of two subscribing witnesses, on this 7th day of May, A. D. 1887.

CHARLES E. W. WOODWARD.

Witnesses:
A. H. SPENCER,
JOHN C. LANE.